(12) United States Patent
Kim et al.

(10) Patent No.: US 12,334,055 B2
(45) Date of Patent: Jun. 17, 2025

(54) STOCHASTIC FUTURE CONTEXT FOR SPEECH PROCESSING

(71) Applicant: ASAPP, INC., New York, NY (US)

(72) Inventors: Kwangyoun Kim, Santa Clara, CA (US); Felix Wu, Ithaca, NY (US); Prashant Sridhar, New York, NY (US); Kyu Jeong Han, Pleasanton, CA (US)

(73) Assignee: ASAPP, INC., New York, NY (US)

( * ) Notice: Subject to any disclaimer, the term of this patent is extended or adjusted under 35 U.S.C. 154(b) by 461 days.

(21) Appl. No.: 17/530,139

(22) Filed: Nov. 18, 2021

(65) Prior Publication Data

US 2022/0319501 A1 Oct. 6, 2022

Related U.S. Application Data

(60) Provisional application No. 63/170,172, filed on Apr. 2, 2021.

(51) Int. Cl.
*G10L 15/16* (2006.01)
*G06F 16/34* (2025.01)
(Continued)

(52) U.S. Cl.
CPC .............. *G10L 15/16* (2013.01); *G06N 3/045* (2023.01); *G10L 15/26* (2013.01)

(58) Field of Classification Search
CPC . G06N 3/08; G06N 3/04; G06N 3/045; G06F 16/345; H04R 3/005
See application file for complete search history.

(56) References Cited

U.S. PATENT DOCUMENTS 11,615,799 B2 * 3/2023 Zhu .................... G06F 16/345
  704/235
11,783,811 B2 * 10/2023 Kurata .................. G06N 3/08
  704/231

(Continued)

OTHER PUBLICATIONS

Bu, Hui , et al., "AISHELL-1: An Open-Source Mandarin Speech Corpus and a Speech Recognition Baseline", 20th Conference of the Oriental Chapter of the International Coordinating Committee on Speech Databases and Speech I/O Systems and Assessment (O-COCOSDA), arXiv:1709.05522v1 [cs.CL], https://arxiv.org/pdf/1709.05522.pdf, Sep. 16, 2017, 5 pages.

(Continued)

*Primary Examiner* — Farzad Kazeminezhad
(74) *Attorney, Agent, or Firm* — GTC Law Group PC & Affiliates

(57) ABSTRACT

The amount of future context used in a speech processing application allows for tradeoffs between performance and the delay in providing results to users. Existing speech processing applications may be trained with a specified future context size and perform poorly when used in production with a different future context size. A speech processing application trained using a stochastic future context allows a trained neural network to be used in production with different amounts of future context. During an update step in training, a future-context size may be sampled from a probability distribution, used to mask a neural network, and compute an output of the masked neural network. The output may then be used to compute a loss value and update parameters of the neural network. The trained neural network may then be used in production with different amounts of future context to provide greater flexibility for production speech processing applications.

20 Claims, 10 Drawing Sheets

(51) Int. Cl.
G06F 40/30 (2020.01)
G06N 3/04 (2023.01)
G06N 3/045 (2023.01)
G06N 3/08 (2023.01)
G10L 15/06 (2013.01)
G10L 15/26 (2006.01)
H04R 3/00 (2006.01)

(56) References Cited

U.S. PATENT DOCUMENTS

| | | | | |
|---|---|---|---|---|
| 2016/0322055 | A1* | 11/2016 | Sainath | H04R 3/005 |
| 2017/0103752 | A1* | 4/2017 | Senior | G10L 15/16 |
| 2019/0051291 | A1* | 2/2019 | Yoo | G06N 3/045 |
| 2019/0228763 | A1* | 7/2019 | Czarnowski | G06N 3/04 |
| 2021/0350786 | A1* | 11/2021 | Chen | G10L 15/063 |
| 2023/0306206 | A1* | 9/2023 | Dutta | G06F 40/30 |

OTHER PUBLICATIONS

Chan, William, et al., "Listen, Attend and Spell", arXiv:1508.01211v2 [cs.CL], https://arxiv.org/pdf/1508.01211.pdf, Aug. 20, 2015, 16 pages.

Chiu, Chung-Cheng, et al., "A Comparison of End-To-End Models for Long-Form Speech Recognition", arXiv:1911.02242v1 [eess.AS], https://arxiv.org/pdf/1911.02242.pdf, Nov. 6, 2019, 8 pages.

Chiu, Chung-Cheng, et al., "Monotonic Chunkwise Attention", arXiv:1712.05382v2 [cs.CL], https://arxiv.org/pdf/1712.05382.pdf, Feb. 23, 2018, 16 pages.

Chiu, Chung-Cheng, et al., "State-Of-The-Art Speech Recognition with Sequence-To-Sequence Models", arXiv:1712.01769v6 [cs.CL], https://arxiv.org/pdf/1712.01769.pdf, Feb. 23, 2018, 5 pages.

Graves, Alex, et al., "Connectionist Temporal Classification: Labelling Unsegmented Sequence Data with Recurrent Neural Networks", Proceedings of the 23rd International Conference on Machine Learning (ICML 2006), Pittsburgh, PA, Jun. 25-29, 2006, 8 pages.

Graves, Alex, "Sequence Transduction with Recurrent Neural Networks", arXiv:1211.3711v1 [cs.NE], https://arxiv.org/pdf/1211.3711.pdf, Nov. 14, 2012, 9 pages.

Gulati, Anmol, et al., "Conformer: Convolution-augmented Transformer for Speech Recognition", arXiv:2005.08100v1 [eess.AS], https://arxiv.org/pdf/2005.08100.pdf, May 16, 2020, 5 pages.

Han, Wei, et al., "ContextNet: Improving Convolutional Neural Networks for Automatic Speech Recognition with Global Context", arXiv:2005.03191v3 [eess.AS], https://arxiv.org/pdf/2005.03191.pdf, May 16, 2020, 5 pages.

Hendrycks, Dan, et al., "Gaussian Error Linear Units (GELUS)", arXiv:1606.08415v4 [cs.LG], https://arxiv.org/pdf/1606.08415.pdf, Jul. 8, 2020, 9 pages.

Hori, Takaaki, et al., "Joint CTC/attention decoding for end-to-end speech recognition", Proceedings of the 55th Annual Meeting of the Association for Computational Linguistics (vol. 1: Long Papers), Vancouver, Canada, https://doi.org/10.18653/v1/P17-1048, Jul. 30-Aug. 4, 2017, pp. 518-529.

Jaitly, Navdeep, et al., "A Neural Transducer", 29th Conference on Neural Information Processing Systems (NIPS 2016), Barcelona, Spain, arXiv:1511.04868v4 [cs.LG], https://arxiv.org/pdf/1511.04868.pdf, Aug. 4, 2016, 10 pages.

Li, Jinyu, et al., "Developing RNN-T Models Surpassing High-Performance Hybrid Models with Customization Capability", arXiv:2007.15188v1 [eess.AS], https://arxiv.org/pdf/2007.15188.pdf, Jul. 30, 2020, 5 pages.

Miao, Yajie, et al., "EESEN: End-To-End Speech Recognition Using Deep RNN Models and WFST-Based Decoding", arXiv:1507.08240v3 [cs.CL], https://arxiv.org/pdf/1507.08240.pdf, Oct. 18, 2015, 8 pages.

Narayanan, Arun, et al., "Cascaded Encoders for Unifying Streaming and Non-Streaming ASR", arXiv:2010.14606v1 [eess.AS], https://arxiv.org/pdf/2010.14606.pdf, Oct. 27, 2020, 5 pages.

Ott, Myle, et al., "FAIRSEQ: A Fast, Extensible Toolkit for Sequence Modeling", Proceedings of NAACL-HLT 2019: Demonstration, arXiv:1904.01038v1 [cs.CL], http://128.84.21.203/pdf/1904.01038, Apr. 1, 2019, 6 pages.

Panayotov, Vassil, et al., "Librispeech: An ASR Corpus Based on Public Domain Audio Books", 2015 IEEE International Conference on Acoustics, Speech and Signal Processing (ICASSP), 2015, pp. 5206-5210.

Panchapagesan, Sankaran, et al., "Efficient Knowledge Distillation for RNN-Transducer Models", arXiv:2011.06110v1 [eess.AS], https://arxiv.org/pdf/2011.06110.pdf, Nov. 11, 2020, 5 pages.

Park, Daniel S., et al., "SpecAugment on Large Scale Datasets", arXiv:1912.05533v1 [eess.AS], https://arxiv.org/pdf/1912.05533.pdf, Dec. 11, 2019, 5 pages.

Park, Daniel S., et al., "SpecAugment: A Simple Data Augmentation Method for Automatic Speech Recognition", Interspeech, arXiv:1904.08779v3 [eess.AS], https://arxiv.org/pdf/1904.08779.pdf, Dec. 3, 2019, 6 pages.

Radford, Alec, et al., "Improving Language Understanding by Generative Pre-Training", https://s3-us-west-2.amazonaws.com/openai-assets/research-covers/language-unsupervised/language_understanding_paper.pdf, 2018, 12 pages.

Raffel, Colin, et al., "Online and Linear-Time Attention by Enforcing Monotonic Alignments", arXiv:1704.00784v2 [cs.LG], https://arxiv.org/pdf/1704.00784.pdf, Jun. 29, 2017, 19 pages.

Tripathi, Anshuman, et al., "Transformer Transducer: One Model Unifying Streaming and Non-Streaming Speech Recognition", arXiv:2010.03192v1 [cs.SD], https://arxiv.org/pdf/2010.03192.pdf, Oct. 7, 2020, 5 pages.

Vaswani, Ashish, et al., "Attention Is All You Need", 31st Conference on Neural Information Processing Systems (NIPS 2017), Long Beach, CA, USA., arXiv:1706.03762v5 [cs.CL], https://arxiv.org/pdf/1706.03762.pdf, Dec. 6, 2017, 15 pages.

Watanabe, Shinji, et al., "ESPnet: End-to-End Speech Processing Toolkit", arXiv:1804.00015v1 [cs.CL], https://arxiv.org/pdf/1804.00015.pdf, Mar. 30, 2018, 5 pages.

Watanabe, Shinji, et al., "ESPnet: End-to-End Speech Processing Toolkit", Proceedings of the Annual Conference of the International Speech Communication Association 2018, Hyderabad, India, https://doi.org/10.21437/Interspeech.2018-1456, Sep. 2-6, 2018, pp. 2207-2211.

Watanabe, Shinji, et al., "Hybrid CTC/Attention Architecture for End-to-End Speech Recognition", IEEE Journal of Selected Topics in Signal Processing, vol. 11, No. 8, Dec. 2017, pp. 1240-1253.

Watanabe, S., et al., "Hybrid CTC/Attention Architecture for End-to-End Speech Recognition", Mitsubishi Electric Research Laboratories, TR2017-190, https://www.merl.com/publications/docs/TR2017-190.pdf, Oct. 2017, 16 pages.

Weng, Chao, et al., "Minimum Bayes Risk Training of RNN-Transducer for End-to-End Speech Recognition", Interspeech 2020, Shanghai, China, https://www.isca-speech.org/archive/pdfs/interspeech_2020/weng20_interspeech.pdf, Oct. 25-29, 2020, pp. 966-970.

Yeh, Ching-Feng, et al., "Transformer-Transducer: End-To-End Speech Recognition with Self-Attention", arXiv:1910.12977v1 [eess.AS], https://arxiv.org/pdf/1910.12977.pdf, Oct. 28, 2019, 5 pages.

Yu, Jiahui, et al., "Dual-Mode ASR: Unify and Improve Streaming ASR with Full-Context Modeling", ICLR 2021, https://openreview.net/pdf?id=Pz_dcqfcKW8, 2021, 13 pages.

Yu, Jiahu, et al., "Dual-Mode ASR: Unify and Improve Streaming ASR with Full-Context Modeling", arXiv:2010.06030v2 [cs.CL], https://arxiv.org/pdf/2010.06030.pdf, Jan. 27, 2021, 13 pages.

Zhang, Yu, et al., "Pushing the Limits of Semi-Supervised Learning for Automatic Speech Recognition", arXiv:2010.10504v1 [eess.AS], https://arxiv.org/pdf/2010.10504.pdf, Oct. 20, 2020,, 11 pages.

Zhang, Qian, et al., "Transformer transducer: a Streamable Speech Recognition Model with Transformer Encoders and RNN-T loss", arXiv:2002.02562v2 [eess.AS], https://arxiv.org/pdf/2002.02562.pdf, final version of the paper submitted to IEEE International Conference on Acoustics, Speech and Signal Processing (ICASSP) 2020 on Oct. 21, 2019, Feb. 14, 2020, 5 pages.

* cited by examiner

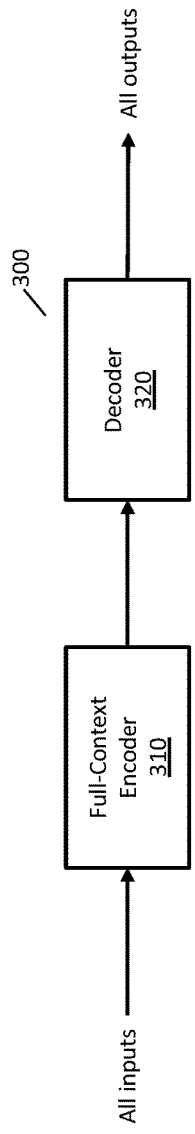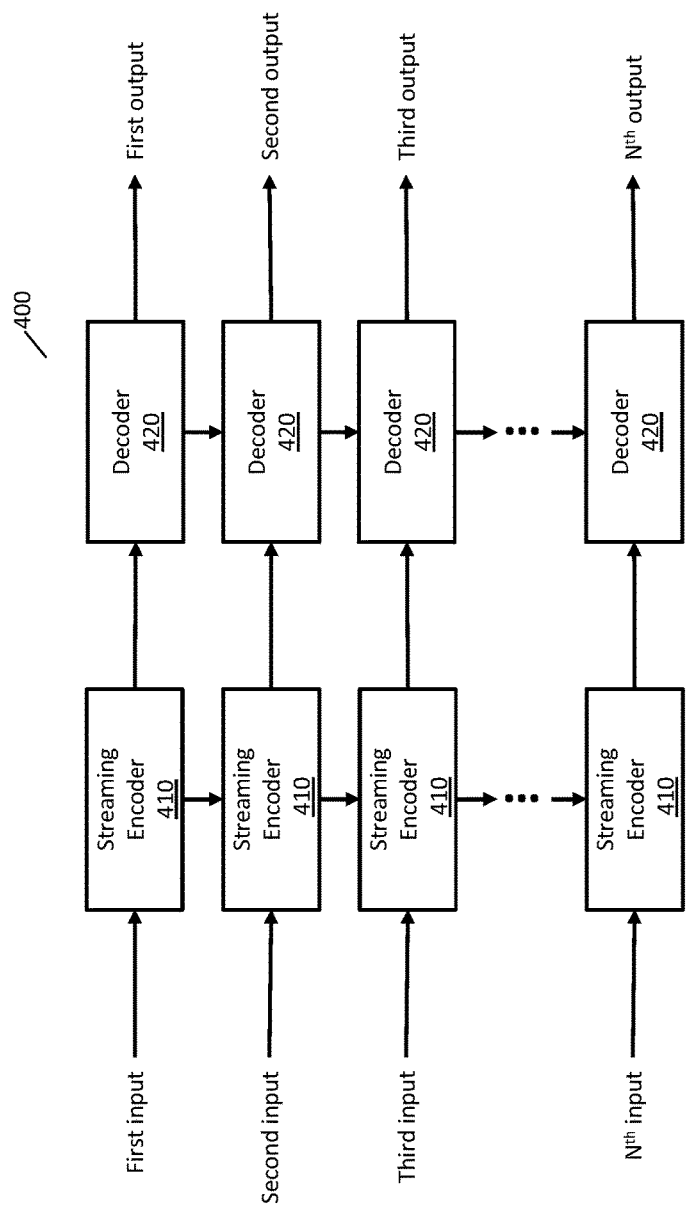

STOCHASTIC FUTURE CONTEXT FOR SPEECH PROCESSING

CLAIM OF PRIORITY

This patent application claims the benefit of U.S. Patent Application Ser. No. 63/170,172, filed Apr. 2, 2021, and entitled "MULTI-MODE TRANSFORMER TRANSDUCER WITH STOCHASTIC FUTURE CONTEXT".

The content of the foregoing application is hereby incorporated by reference in its entirety for all purposes.

BACKGROUND

Speech may be processed by computers for a variety of applications, such as speech recognition (or speech to text), sentiment analysis, speaker verification, or speaker identification.

In some instances, it may be desired to obtain the speech processing results with little delay. For example, when dictating a text message. To obtain speech processing results more quickly, speech processing may operate in a streaming mode. Processing speech in a streaming mode may, however, reduce the quality or accuracy of the speech processing.

In some instances, it may be desired to increase the quality or accuracy of speech processing. To obtain higher quality or accuracy, speech processing may operate in a full context or batch mode. Processing speech in a full context or batch mode may increase the delay in providing the speech processing results to a user or customer.

Techniques for processing speech that improve the tradeoffs between quality of the speech processing and the delay in providing results may increase the value or utility of the speech processing for users.

SUMMARY

In some aspects, the techniques described herein relate to a computer-implemented method, including: obtaining a corpus of training data; initializing parameters of a neural network; and training the parameters of the neural network with a plurality of update steps, wherein a first update step includes: determining a first future-context size by sampling a probability distribution, masking the neural network using the first future-context size to obtain a first masked neural network, computing a first output of the neural network by processing a first sample of the training data with the first masked neural network, computing a first loss value using the first output, and updating the parameters of the neural network using the first loss value.

In some aspects, the techniques described herein relate to a computer-implemented method, wherein a second update step includes: determining a second future-context size by sampling the probability distribution, masking the neural network using the second future-context size to obtain a second masked neural network, computing a second output of the neural network by processing a second sample of the training data with the second masked neural network, computing a second loss value using the second output, and updating the parameters of the neural network using the second loss value.

In some aspects, the techniques described herein relate to a computer-implemented method, wherein: the first update step includes computing a second output of the neural network by processing the first sample of the training data with the neural network without any masking; and computing the first loss value includes using the second output.

In some aspects, the techniques described herein relate to a computer-implemented method, wherein computing the first loss value includes computing a computing one or more of a transducer loss, a cross-entropy loss, or a distillation loss.

In some aspects, the techniques described herein relate to a computer-implemented method, wherein the neural network includes an encoder and a decoder.

In some aspects, the techniques described herein relate to a computer-implemented method, wherein the neural network includes a plurality of feed-forward neural network layers and a plurality of attention neural network layers.

In some aspects, the techniques described herein relate to a computer-implemented method, wherein the probability distribution is a normal probability distribution or a truncated normal probability distribution.

In some aspects, the techniques described herein relate to a computer-implemented method, wherein masking the neural network includes masking all layers of the neural network using the first future-context size.

In some aspects, the techniques described herein relate to a system, including: at least one server computer including at least one processor and at least one memory, the at least one server computer configured to: obtain a corpus of training data; initialize parameters of a neural network; and train the parameters of the neural network with a plurality of update steps, wherein a first update step includes: determining a first future-context size by sampling a probability distribution, masking the neural network using the first future-context size to obtain a first masked neural network, computing a first output of the neural network by processing a first sample of the training data with the first masked neural network, computing a first loss value using the first output, and updating the parameters of the neural network using the first loss value.

In some aspects, the techniques described herein relate to a system, wherein the system includes at least one production server computer configured to: use the neural network in a first production speech processing application with a first production future-context size, wherein the neural network is masked using the first production future-context size; and use the neural network in a second production speech processing application with a second production future-context size, wherein the neural network is masked using the second production future-context size.

In some aspects, the techniques described herein relate to a system, wherein the first production speech processing application converts speech to text.

In some aspects, the techniques described herein relate to a system, wherein the first production future-context size is different from the first future-context size.

In some aspects, the techniques described herein relate to a system, wherein the neural network includes a transformer layer.

In some aspects, the techniques described herein relate to a system, wherein the first update step includes: determining a second future-context size by sampling the probability distribution; wherein masking of the neural network includes masking a first layer of the neural network using the first future-context size and masking a second layer of the neural network using the second future-context size.

In some aspects, the techniques described herein relate to a system, wherein the second future-context size is constrained by the first future-context size.

In some aspects, the techniques described herein relate to one or more non-transitory, computer-readable media including computer-executable instructions that, when executed, cause at least one processor to perform actions including: obtaining a corpus of training data; initializing parameters of a neural network; and training the parameters of the neural network with a plurality of update steps, wherein a first update step includes: determining a first future-context size by sampling a probability distribution, masking the neural network using the first future-context size to obtain a first masked neural network, computing a first output of the neural network by processing a first sample of the training data with the first masked neural network, computing a first loss value using the first output, and updating the parameters of the neural network using the first loss value.

In some aspects, the techniques described herein relate to one or more non-transitory, computer-readable media, wherein the first loss value is a transducer loss or a cross-entropy loss.

In some aspects, the techniques described herein relate to one or more non-transitory, computer-readable media, wherein computing the first loss value includes computing a Kullback-Leibler divergence.

In some aspects, the techniques described herein relate to one or more non-transitory, computer-readable media, wherein the neural network includes a convolutional layer.

In some aspects, the techniques described herein relate to one or more non-transitory, computer-readable media, wherein the probability distribution is a uniform probability distribution.

BRIEF DESCRIPTION OF THE FIGURES

The invention and the following detailed description of certain embodiments thereof may be understood by reference to the following figures:

FIG. 3 is an example system for full-context speech processing using an encoder-decoder architecture.

FIG. 4 is an example system for streaming (or no future-context) speech processing using an encoder-decoder architecture.

DETAILED DESCRIPTION

Figure 1:
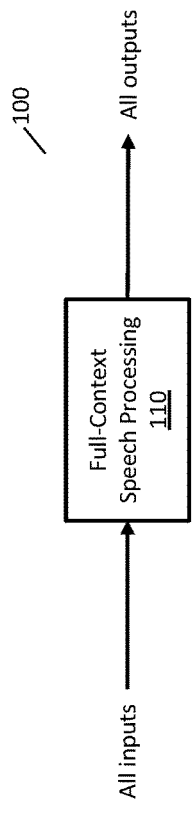
FIG. 1 is an example system for batch or full context speech processing.

Speech processing applications may process an audio signal (e.g., digital samples of a speech signal obtained from a microphone) to compute some form of speech processing results. Examples of speech processing include speech recognition (or converting speech to text), sentiment analysis, speaker verification, or speaker identification.

A speech processing application may operate in a streaming mode (no future context) to produce the speech processing results more quickly. Streaming audio may be received (e.g., from the microphone of a smartphone or other portable device) and processed. In a streaming mode, received audio data may be processed immediately without waiting for future audio data. For example, after sufficient audio data is received to form a frame of audio data (e.g., every 10 milliseconds), that frame may be processed to determine an output of the speech processing application (e.g., for speech recognition, a next grapheme or phoneme corresponding to the audio).

A speech processing application may also operate in a full context or batch mode where an entire utterance is received and processed before providing an output of the speech processing application. The end of an utterance may be determined using any appropriate techniques, such as end pointing or waiting for pauses greater than a specified duration.

For both computers and humans, later speech may assist in the processing of earlier speech. For example, when a person says "ice cream," after hearing just the first portion, it may not be clear if the person is saying "ice cream" or "I scream" since those two phrases sound similar to each other. If the next word is "cone", then a speech recognition may be more confident that the entire phrase is "ice cream cone." Accordingly, since full context speech processing has more information available, it may produce more accurate or higher quality results. Waiting for additional speech to arrive, however, increases the delay between receiving the speech and providing speech processing results.

A tradeoff between streaming speech recognition and full context speech recognition is to use some future context to increase accuracy but not so much future context to unduly delay providing speech recognition results. An amount of future context that is between streaming and full context will be referred to herein as limited future context. For example, in some applications, using a future context of 100 milliseconds may significantly increase accuracy and may be an acceptable delay for the end user.

In some implementations, a mathematical model (e.g., a neural network) for speech processing may be trained with a specific future context, such as streaming (no future context), some limited future context (e.g., 100 milliseconds), or full context. Such models may perform well for the future context they were trained for, but the performance of such models may degrade significantly if the future context is changed. For example, if a mathematical model is trained for streaming speech processing, that model may work well in production for streaming speech processing, but if that streaming model is used in production with some limited future context (in an attempt to increase accuracy), then the performance of that model may be worse instead of better since the production future context is different from the training future context.

Accordingly, to change the amount of context used by a mathematical model in a deployed speech processing application, it may be needed to train a new mathematical model with the desired context. Training a mathematical model may be expensive (in terms of person hours and compute resources) and time consuming, and these high costs may make it prohibitive to change the context used by a production speech processing application.

Applicant's invention addresses this issue by using a combination of features to more robustly process speech. One feature is the generation of a model that performed well with different amounts of future context. The model is generated with a training method and system that trains the model using different amounts of future context. The training is accomplished by selecting different amounts of future context according to a probability distribution. These distributions can include uniform distributions, normal distributions, and the like. Training the neural network further includes computing a loss value which may include transducer loss, cross-entropy loss, or a distillation loss.

The techniques described herein allow for the training of a single mathematical model that performs well in a speech processing application with differing amounts of future context. A single model may be used for streaming, with full context, or any amount of limited future context in between. Having such a model allows for easy adjustment of the future context used in a speech processing application and allows for easier tradeoffs between higher accuracy and reduced delay in providing speech processing results.

FIG. 1 is an example system 100 for batch or full context speech processing. In FIG. 1, full-context speech processing component 110 receives all inputs corresponding to a speech utterance (e.g., all of the digital samples, frames, or feature vectors). Full-context speech processing component 110 processes all of the inputs to generate all of the outputs, such as text corresponding to the speech. As noted above, full-context speech processing component 110 may have higher accuracy because it is processing all of the speech inputs, but the delivery of the outputs may be delayed as compared to streaming speech processing.

Figure 2:
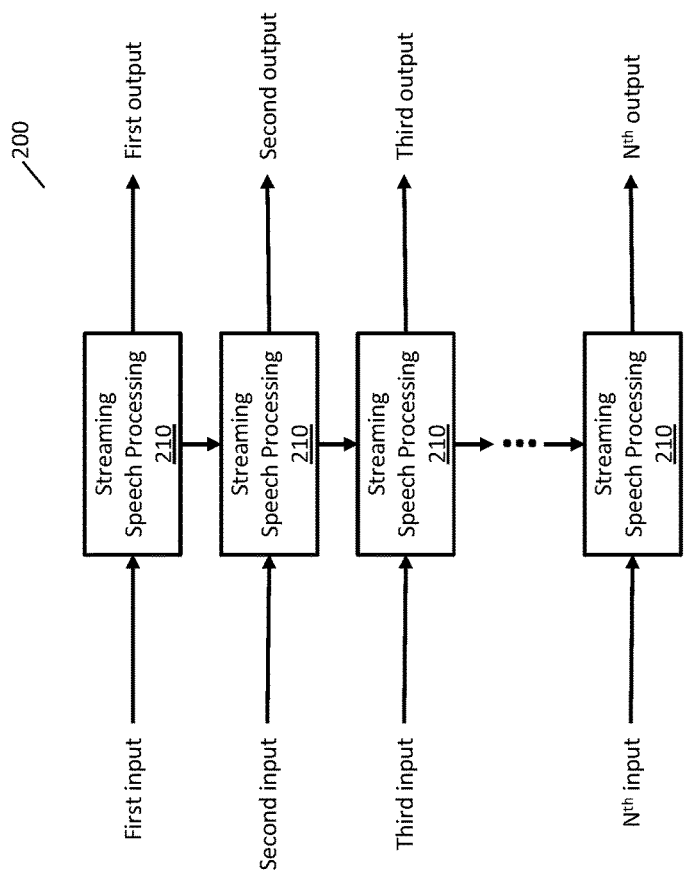
FIG. 2 is an example system for streaming (or no future-context) speech processing.

FIG. 2 is an example system 200 for streaming (or no future-context) speech processing. In FIG. 2, the inputs are processed sequentially. For example, a first input may be processed by streaming speech processing component 210 to produce a first output. When a second input is received, streaming speech processing component 210 may process the second input to produce a second output, and so forth. For example, the first input may be a digital audio sample, a frame, or a feature vector and, for a speech recognition application, the first output may be a grapheme or phoneme corresponding to the speech.

Many variations of streaming speech processing are possible. In some implementations, multiple inputs may be needed to perform an iteration of processing, and the inputs may be collected until sufficient inputs have been received. For example, for a speech processing application that processes frames of speech, digital audio samples may be collected until sufficient digital samples have been obtained to form a speech frame, and the speech frame may then be processed by the speech processing application. In some implementations, the number of outputs may be more or less than the number of inputs. For example, for a speech recognition application, the number of inputs (e.g., digital audio samples, frames, or feature vectors) will typically be less than the number of outputs (e.g., graphemes or phonemes).

Limited future-context speech processing may be implemented, for example, by modifying streaming speech processing to delay processing until additional inputs have been received. For example, a 30th output may be generated after receiving a 40th input.

In some implementations, a speech processing application may use an encoder-decoder architecture. With an encoder-decoder architecture, the speech inputs are first processed by an encoder component to produce an intermediary result. This intermediary result may then be processed by a decoder component to compute the output of the speech processing application. Each of the encoder component and the decoder component may perform full context processing, streaming processing, or use some limited future context in between.

FIG. 3 is an example system 300 for full-context speech processing using an encoder-decoder architecture. In FIG. 3, full-context encoder component 310 receives all inputs corresponding to a speech utterance (e.g., all of the digital samples, frames, or feature vectors) to generate an intermediate result. Decoder component 320 processes the intermediate result to generate all outputs. Decoder component 320 may be a full-context decoder, a limited future-context decoder, or a streaming decoder, although there may be limited benefits to using a streaming decoder with a full-context encoder.

FIG. 4 is an example system 400 for streaming (or no future-context) speech processing using an encoder-decoder architecture. In FIG. 4, the inputs are processed sequentially as above for FIG. 2. For example, a first input may be processed by streaming encoder component 410 to produce a first intermediate result. When a second input is received, streaming encoder component 410 may process the second input to produce a second intermediate result, and so forth. Decoder component 420 may process the intermediate results to produce the outputs. Decoder component 420 may be a full-context decoder, a limited future-context decoder, or a streaming decoder.

Limited future-context speech processing with an encoder-decoder architecture may be implemented as described above by modifying the streaming speech processing to delay processing until additional inputs have been received.

The above examples of speech processing applications may be implemented to work with a fixed amount of future context, such as full context, a specified amount of limited future context (e.g., 100 milliseconds of future context), or no future context (e.g., streaming). It may instead be desired to implement a speech processing application where the amount of future context used to produce the speech processing results is a parameter that may be adjusted. Having an adjustable future context allows a single speech processing application to trade off accuracy and speed as desired. Now described are techniques for implementing a speech processing application with an adjustable amount of future context.

A speech processing application may be trained with a corpus of training data. For example, the training data may include speech data (e.g., digital audio samples or a processed version thereof, such as feature vectors) and training labels that relate to a desired output of the speech processing application. For example, for a speech recognition application, the training labels may be a transcript of the speech (e.g., a sequence of graphemes or phonemes).

A training process for a speech processing application may iterate over the training data and adjust the parameters of the mathematical models of the speech processing application. The training process may include processing mini-batches of training data and updating parameters using stochastic gradient descent.

In some implementations, the training process may include a forward pass that processes speech data (e.g., an utterance) to compute an output of the speech processing application (e.g., for a speech recognition application, an estimate of the text corresponding to the speech). An error value may then be computed by comparing the output of the forward pass with the training label corresponding to the speech data (e.g., for a speech recognition application, an actual transcript of the speech). Where the output of the forward pass is accurate, the error may be small, and where the output of the forward pass is not accurate, the error may be large. A backward pass may then be performed that updates the parameters of the mathematical models using the error value. Where the error value is large, the parameters may be changed by a larger amount, and where the error value is small, the parameters may be changed by a smaller amount.

When training a mathematical model for a speech processing application with a fixed amount of future context, each forward pass will compute an output using that fixed amount of future context. Accordingly, the mathematical model is optimized to produce the most accurate results with that fixed amount of future context. If this mathematical model is used, however, with a different fixed future context, then the accuracy of the model will be much lower because the model is processing a different amount of future context than what it was trained with.

To create a mathematical model that works well with different amounts of future context, the mathematical model may be trained with different values for the amount of future context used. In some implementations, the amount of future context used may be a stochastic future context that is determined during training by sampling a probability distribution. Any appropriate probability distribution may be used, such as a uniform distribution, a normal probability distribution, or a truncated normal probability distribution. The stochastic future context may be determined, for example, for each mini batch or for each training sample. Because the model is trained using multiple values for the future context, the model may learn to produce accurate outputs for multiple values for the future context in a production speech processing application.

In some implementations, a mathematical model may be trained using knowledge distillation. Knowledge distillation may allow a full-context model to help teach a limited future-context model to perform better with the limited amount of available future context.

When training with the knowledge distillation, the loss value may be computed as a combination of a difference loss value and a distillation loss value. The difference loss value may be computed, as described above, using the differences between the output of the forward pass and a training label. For example, where the forward pass is implemented using a transformer neural network, the difference loss may correspond to a transducer loss or a cross-entropy loss.

The distillation loss may help the full-context output teach a limited future-context output to perform better with the limited available future context. The distillation loss may also help improve the consistency of the mathematical model that is being with different amounts of future context. Any appropriate distillation loss may be used, such as a distillation loss computed using a Kullback-Leibler divergence.

In some implementations, a loss value L may be computed as the following:

$$L = L_{diff}(P^C, y) + L_{diff}(P^\infty, y) + L_{distil}(P^C, P^\infty)$$

where y is a training label, C is a stochastic future context being used for a current training iteration, $P^C$ is the output of the forward pass using a future context of C, $P^\infty$ is the output of the forward pass using full context, $L_{diff}(P^C, y)$ is the difference loss using a future context of C, $L_{diff}(P^\infty, y)$ is the difference loss using full context, and $L_{distil}(P^C, P^\infty)$ is the distillation loss computed using $P^C$ and $P^\infty$. For example, $L_{distil}(P^C, P^\infty)$ may be computed as the Kullback-Leibler divergence between $P^C$ and $P^\infty$.

Other variations of the above are also possible. In some implementations, a loss value may also be computed with one or more of $L_{diff}(P^C, y)$, $L_{distil}(P^C, P^0)$, or $L_{distil}(P^0, P^\infty)$, where $P^0$ is the output of the forward pass without any future context.

In some implementations, distillation loss values may be computed more efficiently by merging the probabilities of less important tokens. For example, the vectors $P^0$, $P^C$, $P^\infty$ may be modified to have a shorter length, such as a length of three. The shorter vectors may include probabilities for the training label, a blank token, and a single value for all other tokens.

The above techniques may be used for a variety of speech processing applications. Now described are additional details for implementing an automatic speech recognition or speech-to-text application using the techniques described herein. For example, a speech recognition application may use an encoder-decoder architecture.

Figure 5:
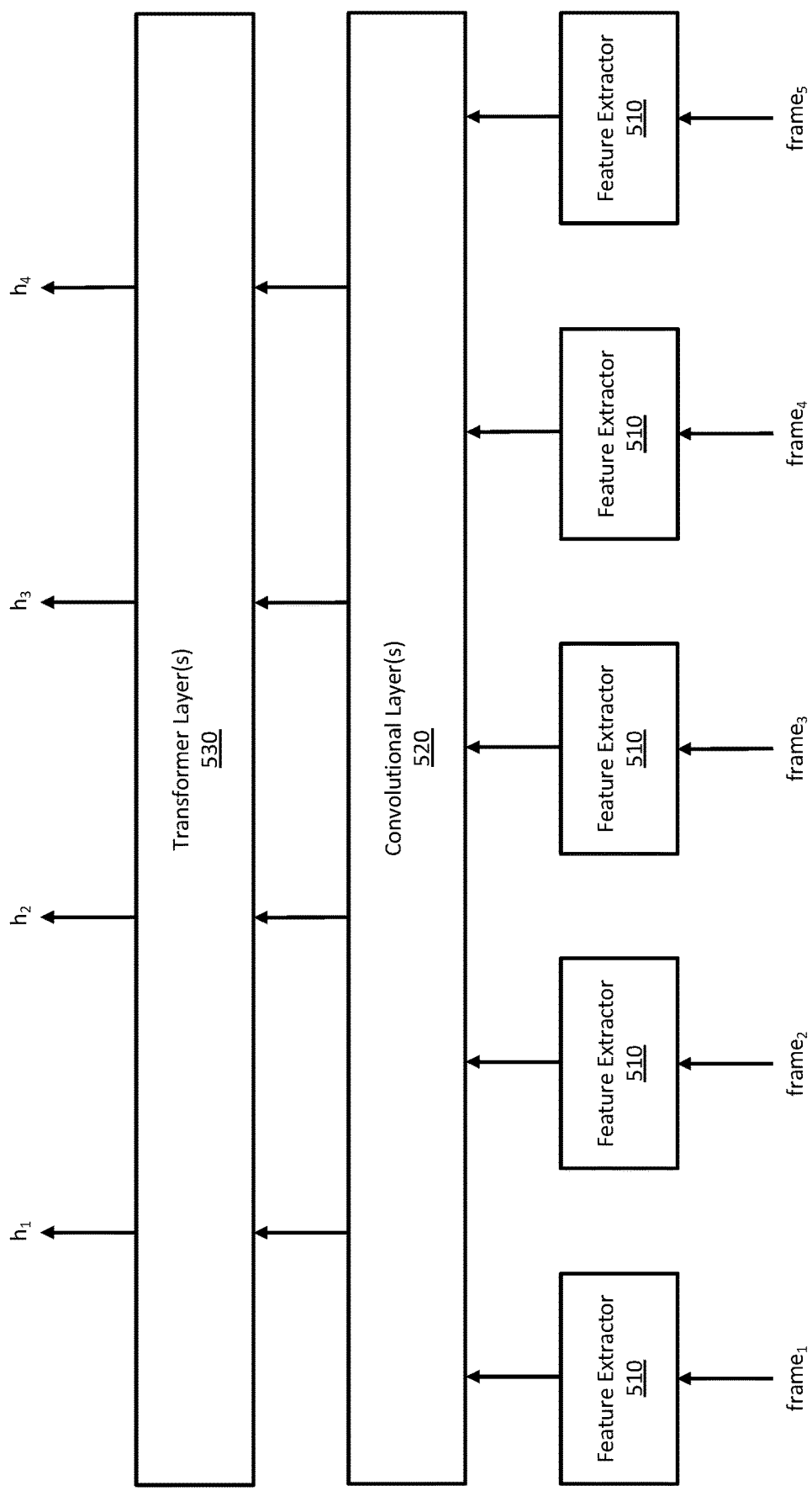
FIG. 5 is an example implementation of a transformer encoder that may be used with a speech recognition application.

FIG. 5 is an example implementation of a transformer encoder that may be used with a speech recognition application. The input to the encoder is a sequence of audio frames. For example, an audio frame may correspond to a portion of an audio signal (e.g., 25 milliseconds) and subsequent frames may be spaced at 10 millisecond intervals. The bottom of FIG. 5 shows an example of 5 frames that may be input into the encoder.

In FIG. 5, feature extractor 510 processes each of the frames to compute a feature vector that represents the frame. Any appropriate feature vectors may be used, such as Mel-frequency cepstral coefficients, filter bank outputs, or Wav2Vec features.

The feature vectors may then be processed by one or more convolutional layers 520. Convolutional layers 520 may be implemented using any appropriate techniques. The output of the convolutional layers 520 may then be processed by one or more transformer layers 530. Transformer layers 530 may be implemented using any appropriate techniques. In some implementations, a transformer may include one or more feed-forward neural network layers and one or more attention neural network layers (e.g., self-attention layers). The output of transformer layers 530 may be referred to as a sequence of embeddings and referred to as $h_1$, $h_2$, $h_3$, etc. as shown in FIG. 5.

Note that the number of outputs of the components of FIG. 5 may change as processing proceeds. For example, the number of outputs of a first convolutional layer may be less than the number of feature vectors, the number of outputs of a second convolutional layer may be less than the number of outputs of the first convolutional layer, the number of outputs of the first transformer may be less than the number of outputs of the last convolutional layer, and so forth. The number of outputs may be reduced, for example, according to the stride of a convolutional layer or because of pooling.

A speech recognition application may be implemented with any appropriate encoder and the techniques described herein are not limited to a transformer encoder, such as shown in FIG. 5. In some implementations, a speech processing application may be implemented using a conformer encoder or using convolutional neural networks without transformers.

Figure 6B:
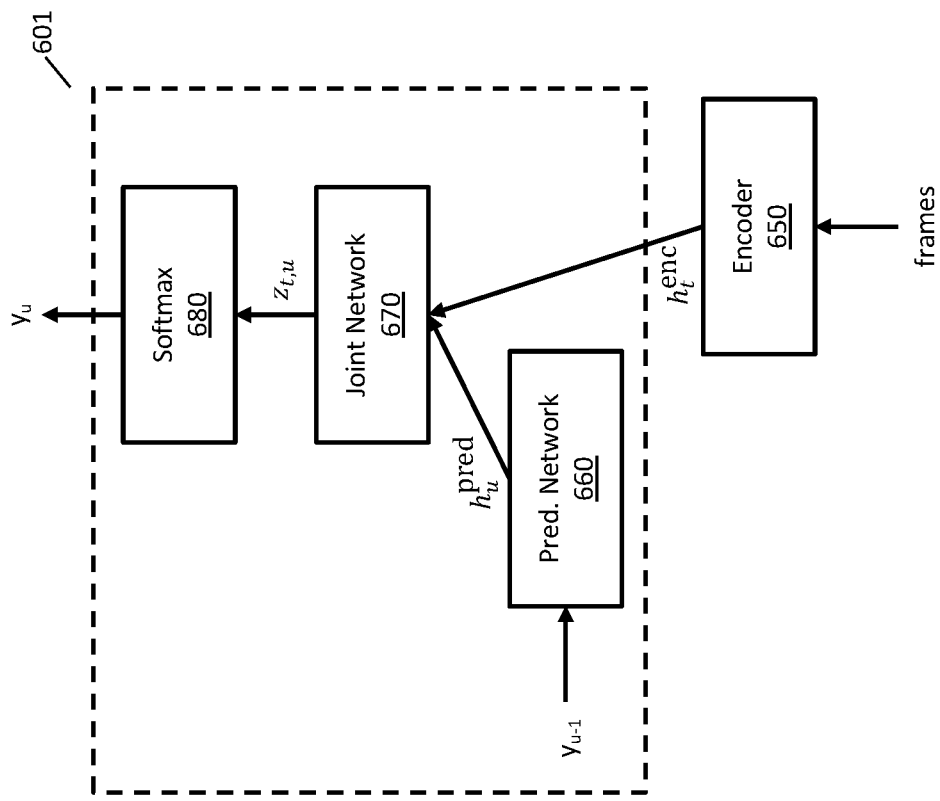
FIGS. 6A and 6B are example implementations of a decoder that may be used with a speech recognition application.
Figure 6A:
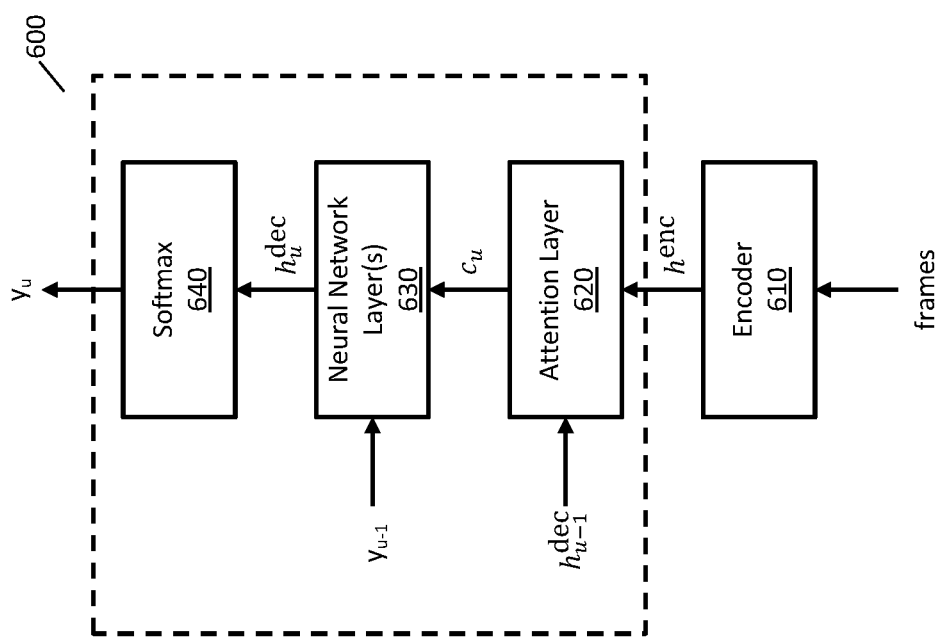

FIGS. 6A and 6B are example implementations of a decoder that may be used with a speech recognition application.

In FIG. 6A, frames are processed by encoder 610 to compute an encoder embedding vector denoted as $h^{enc}$. Encoder 610 may be implemented using any appropriate techniques, such as any of the techniques described herein. In some implementations, the encoder embedding vector $h^{enc}$ may be the concatenation of the individual embeddings computed in FIG. 5.

In FIG. 6A, decoder 600 processes the encoder embedding vector to compute a sequence of outputs denoted as $y_u$. The outputs $y_u$ may be any appropriate outputs of a speech recognition application, such as a sequence of words, graphemes, or phonemes. Decoder 600 may iteratively compute the outputs using various components and layers, such as one or more of attention layer 620, one or more neural network layers 630, or softmax component 640.

Attention layer 620 may process the encoder embedding vector $h^{enc}$ and the decoder embedding vector from a previous iteration $h_{u-1}^{dec}$ (computed by neural network layers 630) to compute a context vector $c_u$. Attention layer 620 may be implemented using any appropriate techniques, such as dot product attention or multi-head attention.

Neural network layers 630 may process the context vector $c_u$ and the previous output $y_{u-1}$ to compute a decoder embedding $h_u^{dec}$. Neural network layers 630 may include an embedding layer for processing $y_{u-1}$. Neural network layers 630 may be implemented using any appropriate techniques, such as a one or more recurrent neural network layers or transformer layers. In some implementations, neural network layers 630 may correspond to a language model.

Softmax component 640 may process the decoder embedding $h_u^{dec}$ using a softmax operation to compute output probabilities for the current iteration. Softmax component 640 may also include a projection layer.

In FIG. 6B, frames are processed by encoder 650 to compute a sequence of encoder embedding vectors denoted as $h_t^{enc}$. Encoder 650 may be implemented using any appropriate techniques, such as any of the techniques described herein. In some implementations, the sequence of encoder embedding vectors $h_t^{enc}$ may be computed as shown in FIG. 5.

In FIG. 6B, decoder 601 processes the sequence of encoder embedding vectors to compute a sequence of outputs denoted as $y_u$. The outputs $y_u$ may be any appropriate outputs of a speech recognition application, such as a sequence of words, graphemes, or phonemes. Decoder 601 may iteratively compute the outputs using various components and layers, such as one or more of prediction network component 660, joint network component 670, or softmax component 680.

Joint network component 670 may iteratively process the sequence of encoder embedding vectors $h_t^{enc}$ and a prediction vector $h_u^{pred}$ (computed by prediction network component 660) to compute a transcription vector $z_{t,u}$. Joint network component 670 may also be referred to as a transcription network and may be implemented using any appropriate techniques. For example, joint network component 670 may be implemented using a bidirectional recurrent neural network.

Prediction network component 660 may process the previous output $y_{u-1}$ to compute the prediction vector $h_u^{pred}$. Prediction network component 660 may be implemented using any appropriate techniques such as a recurrent neural network with long short-term memory or a transformer. In some implementations, prediction network component 660 may correspond to a language model.

Softmax component 680 may process the transcription vector $z_{t,u}$ using a softmax operation to select an output for the current iteration. Softmax component 680 may also include a projection layer.

In implementing any of the speech processing applications described herein, the amount of future context used in the processing may need to be specified. For example, the speech processing application may use no future context, a limited future context, or a full future context. The amount of future context to be used may be specified by masking portions of the neural networks.

FIGS. 7-10 are example implementations of neural networks with different amounts of future context. FIGS. 7-10 may correspond to any of the neural network layers described herein other than a recurrent neural network layer. For example, FIGS. 7-10 may correspond to convolutional layers, attention layers, or transformer layers. In each of FIGS. 7-10, the inputs are shown at the bottom as i and the outputs are shown at the top as o. These inputs may correspond to any of the neural network layer inputs and outputs described herein. The number of outputs need not be the same as the number of inputs as described herein. In each of FIGS. 7-10, two layers are shown for clarity of presentation, but any number of layers may be used.

Figure 7:
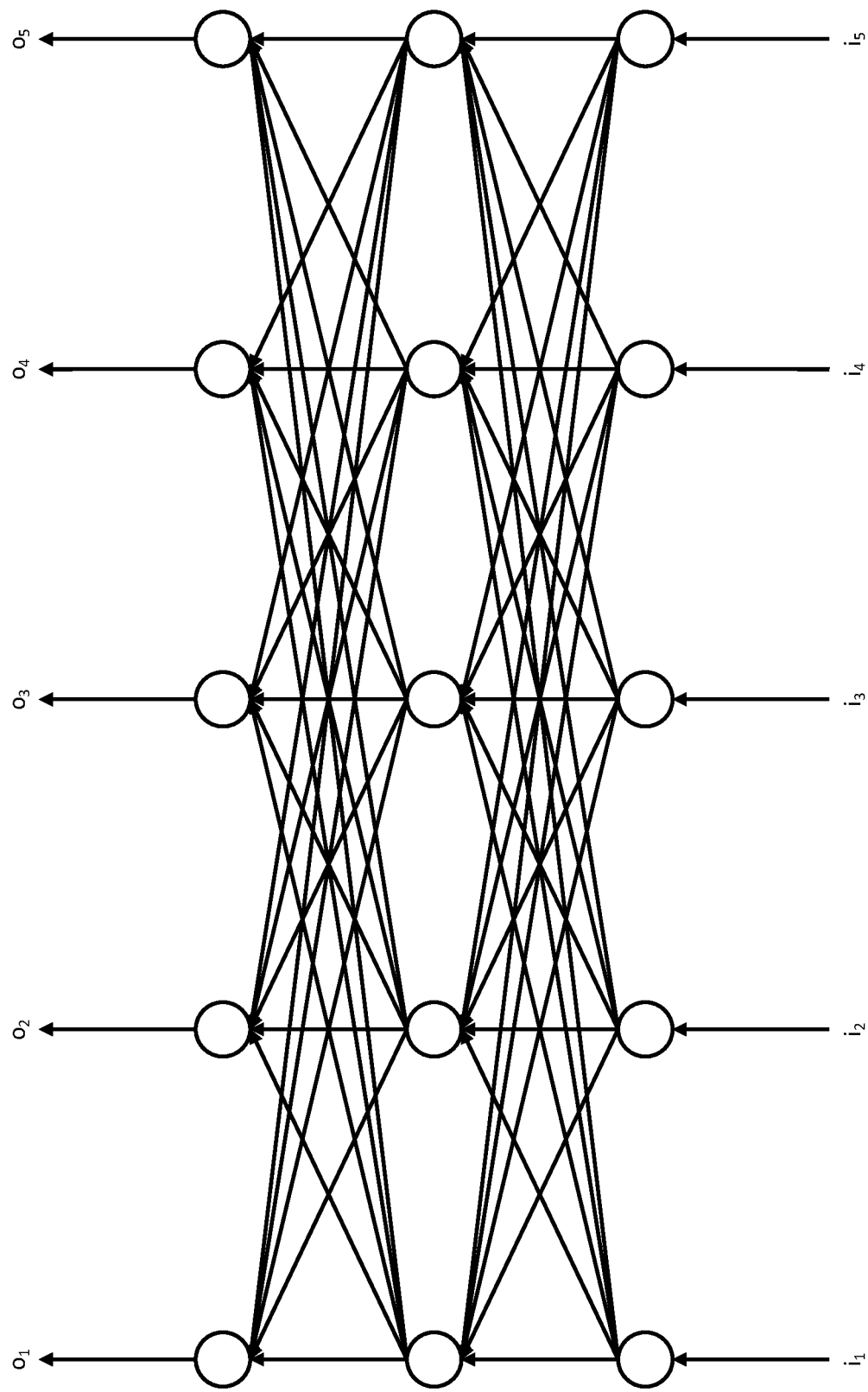
FIG. 7 is an example implementation of a neural network where each layer uses full context and no masking is performed.

FIG. 7 is an example implementation of a neural network where each layer uses full context and no masking is performed. Each node of each neural network layer is computed using each node of the previous layer, and accordingly each output is able to process information from each of the inputs. Because the first output depends on the final input, the first output cannot be provided until all of the inputs have been received and processed. Full context processing thus creates a delay in providing the first output but may produce more accurate outputs since more information is available for processing.

Figure 8:
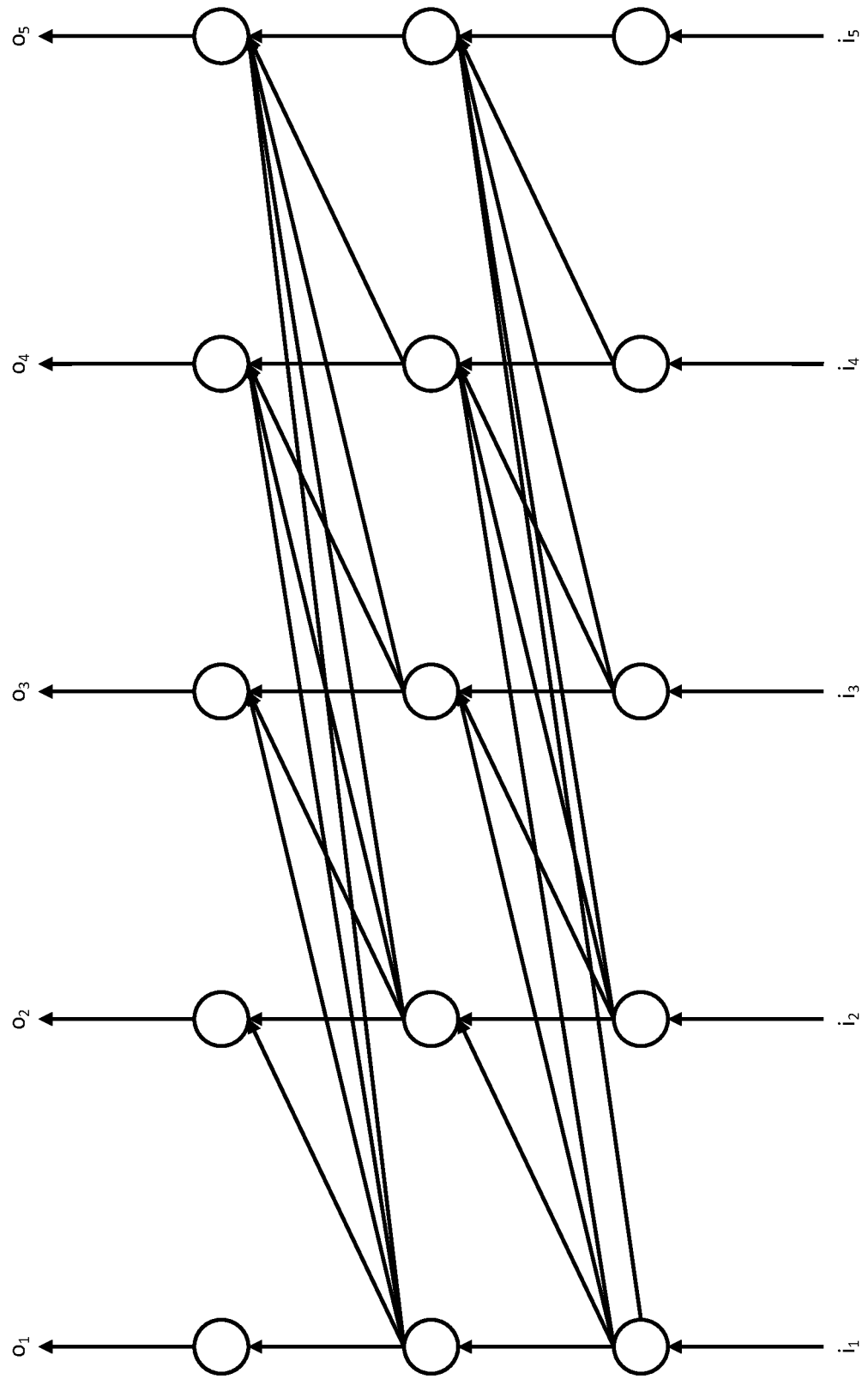
FIG. 8 is an example implementation of a neural network where each layer has no future context.

FIG. 8 is an example implementation of a neural network where each layer has no future context. The future context may be removed using a masking process. A masking process may be implemented using any appropriate techniques, such as setting a weight of the removed paths to 0 or using conditional logic to not perform computations corresponding to the removed paths. Each node of a neural network layer processes only the current and previous nodes of the previous neural network layer. Because each layer is limited to current and previous inputs, the neural network may provide outputs more quickly (e.g., the first output may be provided soon after the first input is received), but the outputs may be less accurate than a neural network that uses future context.

Figure 9:
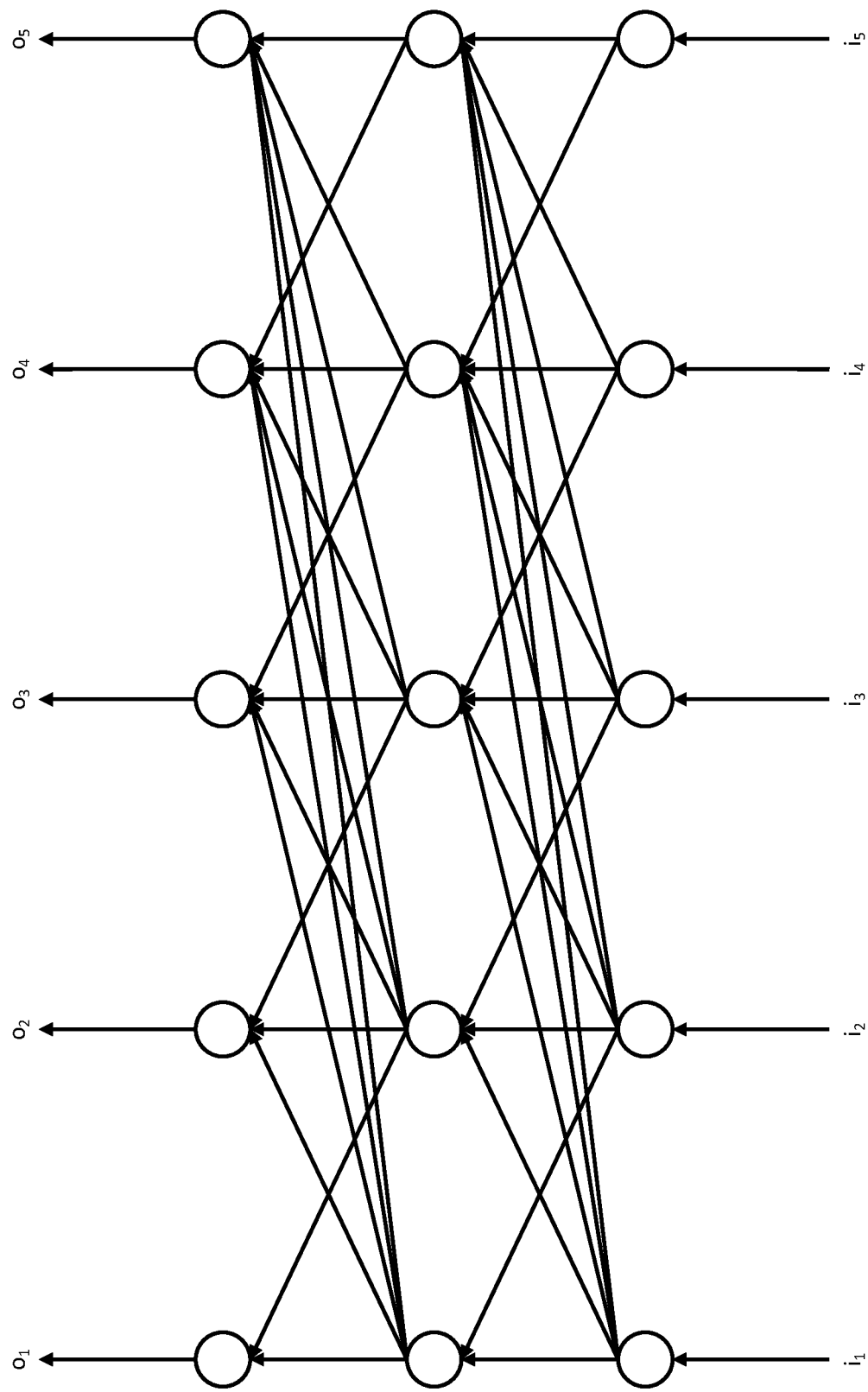
FIG. 9 is an example implementation of a neural network where each layer uses a future context of one.
Figure 10:
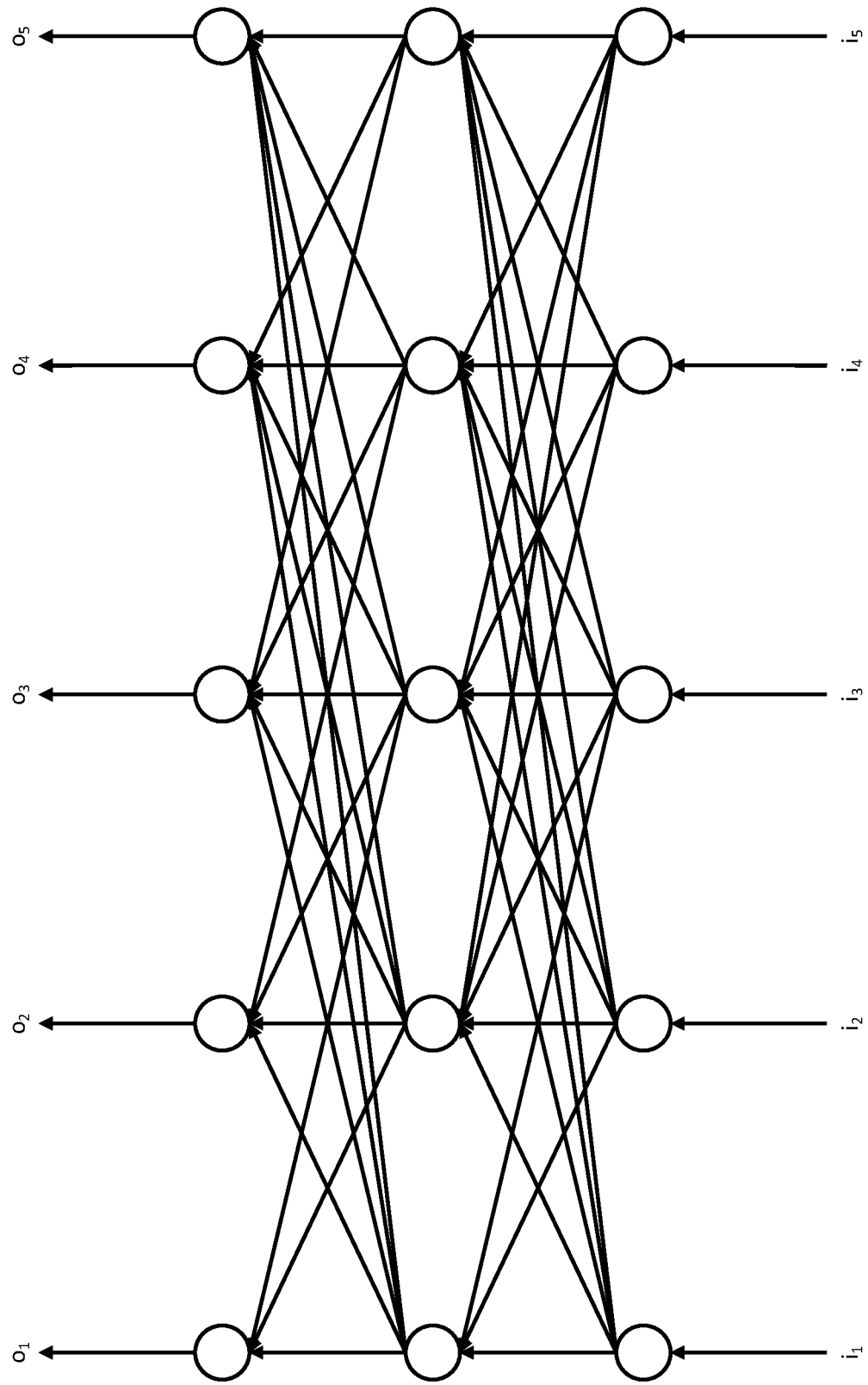
FIG. 10 is an example implementation of a neural network where each layer uses a future context of two.

FIG. 9 is an example implementation of a neural network where each layer uses a future context of one. Each node of the neural network layers process one future node, the current node, and previous nodes of the previous neural network layer. FIG. 10 is an example implementation of a neural network where each layer uses a future context of two. Each node of the neural network layers processes two future nodes, the current node, and previous nodes of the previous neural network layer. Unused future context may be removed using a masking process as described herein. FIGS. 9 and 10 provide a compromise between the full future context of FIG. 7 and the no future context of FIG. 8. Processing may be faster than a neural network with full future context and more accurate than a neural network with no future context.

Note that the total future context of a neural network is the sum of the future contexts of the individual neural network layers. For example, a neural network with five layers where each layer has a future context of two will have a total future context of ten.

Other variations of using future context across different layers of neural networks are possible. In some implementations, each neural network layer will use the same amount of future context as shown in FIGS. 7-10. In some implementations, different neural network layers may use a different amount of future context. For example, a first neural network layer may use no future context and a second neural network layer may use a future context of two.

In some implementations, different neural network layers may use a different amount of future context with constraints. For example, a total future context for a neural network may be assigned and the future context for individual layers may be determined by sampling a probability distribution, such as a uniform probability distribution. A future context may be determined for a first layer by sampling a probability distribution where the largest possible value is the total future context for the neural network. A future context for a second layer may be determined by sampling a probability distribution where the largest possible value is constrained by the remaining future context for the neural network (the total minus the future context of the first layer). This process may be repeated for remaining layers. In some implementations, the probability distribution may be $\mathcal{U}(0, R/d)$, where $\mathcal{U}$ corresponds to a uniform distribution between 0 and $R/d$, R is the remaining future context for the neural network, and d is a tuned parameter.

Sampling from a probability distribution may include choosing a value with a probability defined by the distribution's probability density function. The probability distribution may be discrete or continuous. In one example, a probability distribution may include a discrete uniform distribution from 0 and 4, inclusive. In the example, sampling from the distribution may include selecting one of the numbers in the range (0, 1, 2, 3, or 4) where each number may be selected with a probability of 0.2. The future context for a neural network may be assigned according to the chosen value. Where the probability distribution is continuous, the sampled value may be mapped to a whole number using any appropriate techniques.

Figure 11:
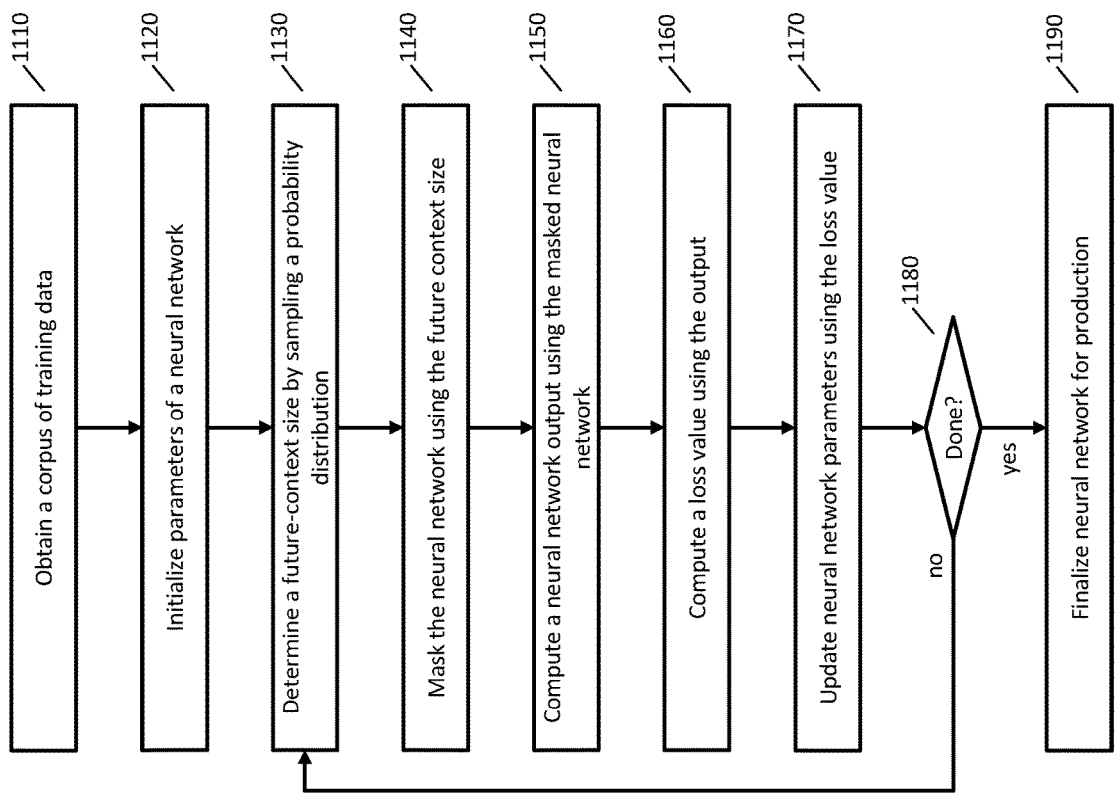
FIG. 11 is a flowchart of an example method for training a neural network for a speech processing application that may use different amounts of future context.

FIG. 11 is a flowchart of an example method for training a neural network for a speech processing application that may use different amounts of future context.

At step 1110, a corpus of training data is obtained. The corpus of training data may include audio data or a representation of audio data, such as frames or feature vectors. The training data may also include labels relevant to the speech processing application. For example, for a speech recognition application, the labels may correspond to a transcription of test in the audio data.

At step 1120, parameters of a neural network are initialized. The parameters may be initialized using any appropriate techniques, such as initialization with random numbers. The neural network may include one or more layers and different layers may have different types, such as any of the layers described herein.

The training process may be an iterative process, where each iteration or update step processes a portion of the training data and/or updates neural network parameters. For example, the portion of the training data may include one or more training samples, a mini-batch of training samples, or a batch of training samples. A training sample may correspond to, for example, an utterance of audio data and may be associated with a training label. Steps 1130 to 1170 correspond to one iteration of the training process that may be repeated as needed.

At step 1130, a future-context size is determined by sampling a probability distribution. Any appropriate probability distribution may be used, such as any of the probability distributions described herein. In some implementations, different neural network layers may use different future-context sizes and a probability distribution may be sampled multiple times or multiple different probability distributions may be sampled.

At step 1140, the neural network is masked using the future-context size from step 1130 (or possible multiple future-context sizes determined at step 1130). The neural network may be masked using any appropriate techniques, such as any of the techniques described herein.

At step 1150, a neural network output is computed by processing a sample of the training data using the masked neural network. The training data may be provided as input to the neural network and processed by the layers of the masked neural network to produce an output where the masking applies the desired future context. The process of computing the neural network output may correspond to a forward pass through the neural network.

In some implementations, other neural network outputs may also be computed. For example, a second neural network output may be computed by processing the training data using the unmasked neural network. For another example, a third neural network output may be computed processing the training data with a different masked neural network, such as a neural network with a mask corresponding to no future context.

In some implementations, step 1140 and step 1150 may be performed simultaneously. For example, when computing the output of the neural network, the amount of future context to be used may be input as a parameter, and the mask may be applied during the computation of the output of the neural network.

At step 1160, a loss value is computed using the output computed at step 1150. Any appropriate loss value may be computed, such as any of the loss values described herein. In some implementations, the loss value may be computed using a training label corresponding to the training sample and/or other neural network outputs, such as full-context neural network output.

At step 1170, parameters of the neural network are updated using the loss value. The neural network parameters may be updated using any appropriate techniques, such as a back propagation using stochastic gradient descent. In some implementations, the loss value may be computed using multiple training samples (e.g., a mini-batch of training samples).

At step 1180 it is determined if the training process is complete. If the training process is not complete then processing proceeds to step 1130 to perform another training iteration. If the training process is complete, then processing proceeds to step 1190. Any appropriate techniques may be used to determine if the training process is complete, such as convergence of a training parameter.

At step 1190, the neural network model is finalized for production so that the neural network may be deployed to production speech processing application using one or more production server computers. In production, the speech processing application may use a production future-context size that is adapted to the needs of the production speech processing application. Any appropriate finalization techniques may be applied, such as quantization model parameters to reduce the resources needed by the model.

Figure 12:
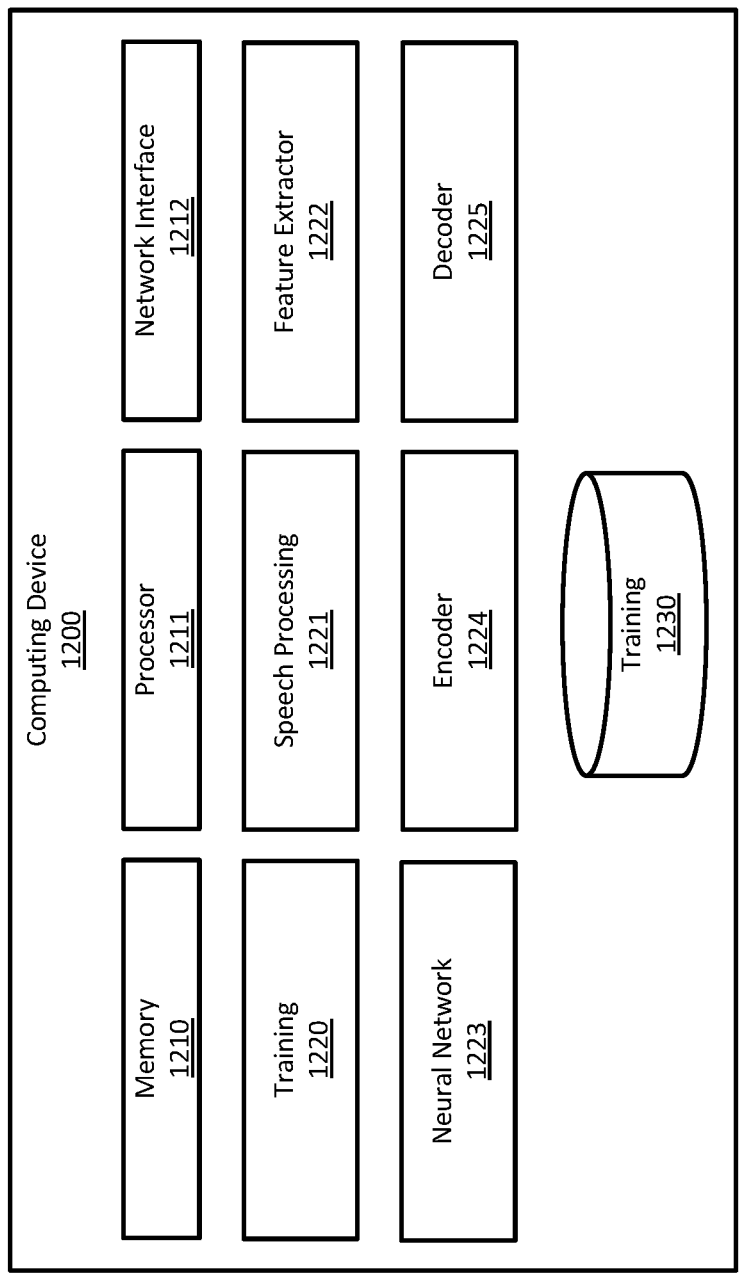
FIG. 12 illustrates components of one implementation of a computing device for implementing any of the techniques described herein.

FIG. 12 illustrates components of one implementation of a computing device 1200 for implementing any of the techniques described herein. In FIG. 12, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 1200 may include any components typical of a computing device, such as volatile or nonvolatile memory 1210, one or more processors 1211, and one or more network interfaces 1212. Computing device 1200 may also include any input and output components, such as displays, keyboards, and touch screens. Computing device 1200 may also include a variety of components or modules providing specific functionality, and these components or modules may be implemented in software, hardware, or a combination thereof. Computing device 1200 may include one or more non-transitory, computer-readable media comprising computer-executable instructions that, when executed, cause a processor to perform actions corresponding to any of the techniques described herein. Below, several examples of components are described for one example implementation, and other implementations may include additional components or exclude some of the components described below.

Computing device 1200 may have a training component 1220 that may perform training of neural network parameters using any of the techniques described herein. Computing device 1200 may have a speech processing component 1221 that may implement a speech processing application using any of the techniques described herein. Computing device 1200 may have a feature extractor component 1222 that may compute feature vectors from an audio signal using any of the techniques described herein. Computing device 1200 may have a neural network component 1223 that may process a training sample to compute a neural network output using any of the techniques described herein. Computing device 1200 may have a encoder component 1224 that may process a training sample to compute an intermediary value using any of the techniques described herein. Computing device 1200 may have a decoder component 1225 that may process an encoder output to compute the output of a speech processing application using any of the techniques described herein.

Computing device 1200 may include or have access to various data stores. Data stores may use any known storage technology such as files, relational databases, non-relational databases, or any non-transitory computer-readable media. Computing device 1200 may have a training data store 1230 that stores training data that may be used to train any of the neural networks described herein.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A computer-implemented method for training a neural network to compute a first output corresponding to a first input, comprising:
    obtaining a corpus of training data;
    initializing parameters of the neural network; and
    training the parameters of the neural network with a plurality of update steps, wherein a first update step comprises:
        determining a first future-context size by sampling a probability distribution to choose a value for the first future-context size with a probability defined by a density function of the probability distribution, wherein the first future-context size corresponds to an amount of input that are future to the first input to be used in computing the first output,
        masking the neural network using the first future-context size to obtain a first masked neural network,
        computing the first output of the neural network by processing a first sample of the training data with the first masked neural network,
        computing a first loss value using the first output, and
        updating the parameters of the neural network using the first loss value.

2. The computer-implemented method of claim 1, wherein a second update step comprises:
    determining a second future-context size by sampling the probability distribution,
    masking the neural network using the second future-context size to obtain a second masked neural network,
    computing a second output of the neural network by processing a second sample of the training data with the second masked neural network,
    computing a second loss value using the second output, and
    updating the parameters of the neural network using the second loss value.

3. The computer-implemented method of claim 1, wherein:
    the first update step comprises computing a second output of the neural network by processing the first sample of the training data with the neural network without any masking; and
    computing the first loss value comprises using the second output.

4. The computer-implemented method of claim 1, wherein computing the first loss value comprises computing a computing one or more of a transducer loss, a cross-entropy loss, or a distillation loss.

5. The computer-implemented method of claim 1, wherein the neural network comprises an encoder and a decoder.

6. The computer-implemented method of claim 1, wherein the neural network comprises a plurality of feed-forward neural network layers and a plurality of attention neural network layers.

7. The computer-implemented method of claim 1, wherein the probability distribution is a normal probability distribution or a truncated normal probability distribution.

8. The computer-implemented method of claim 1, wherein masking the neural network comprises masking all layers of the neural network using the first future-context size.

9. A system for training a neural network to compute a first output corresponding to a first input, comprising:

at least one server computer comprising at least one processor and at least one memory, the at least one server computer configured to:
obtain a corpus of training data;
initialize parameters of the neural network; and
train the parameters of the neural network with a plurality of update steps, wherein a first update step comprises:
determining a first future-context size by sampling a probability distribution to choose a value for the first future-context size with a probability defined by a density function of the probability distribution, wherein the first future-context size corresponds to an amount of input that are future to the first input to be used in computing the first output,
masking the neural network using the first future-context size to obtain a first masked neural network,
computing the first output of the neural network by processing a first sample of the training data with the first masked neural network,
computing a first loss value using the first output, and
updating the parameters of the neural network using the first loss value.

10. The system of claim 9, wherein the system comprises at least one production server computer configured to:
use the neural network in a first production speech processing application with a first production future-context size, wherein the neural network is masked using the first production future-context size; and
use the neural network in a second production speech processing application with a second production future-context size, wherein the neural network is masked using the second production future-context size.

11. The system of claim 10, wherein the first production speech processing application converts speech to text.

12. The system of claim 10, wherein the first production future-context size is different from the first future-context size.

13. The system of claim 9, wherein the first update step comprises:
determining a second future-context size by sampling the probability distribution;
wherein masking of the neural network comprises masking a first layer of the neural network using the first future-context size and masking a second layer of the neural network using the second future-context size.

14. The system of claim 13, wherein the second future-context size is constrained by the first future-context size.

15. The system of claim 9, wherein the neural network comprises a transformer layer.

16. One or more non-transitory, computer-readable media comprising computer-executable instructions that, when executed, cause at least one processor to perform actions for training a neural network to compute a first output corresponding to a first input, comprising:
obtaining a corpus of training data;
initializing parameters of the neural network; and
training the parameters of the neural network with a plurality of update steps, wherein a first update step comprises:
determining a first future-context size by sampling a probability distribution to choose a value for the first future-context size with a probability defined by a density function of the probability distribution, wherein the first future-context size corresponds to an amount of input that are future to the first input to be used in computing the first output,
masking the neural network using the first future-context size to obtain a first masked neural network,
computing the first output of the neural network by processing a first sample of the training data with the first masked neural network,
computing a first loss value using the first output, and
updating the parameters of the neural network using the first loss value.

17. The one or more non-transitory, computer-readable media of claim 16, wherein the first loss value is a transducer loss or a cross-entropy loss.

18. The one or more non-transitory, computer-readable media of claim 16, wherein computing the first loss value comprises computing a Kullback-Leibler divergence.

19. The one or more non-transitory, computer-readable media of claim 16, wherein the neural network comprises a convolutional layer.

20. The one or more non-transitory, computer-readable media of claim 16, wherein the probability distribution is a uniform probability distribution.

* * * * *

UNITED STATES PATENT AND TRADEMARK OFFICE
CERTIFICATE OF CORRECTION

PATENT NO. : 12,334,055 B2
APPLICATION NO. : 17/530139
DATED : June 17, 2025
INVENTOR(S) : Kim et al.

Page 1 of 1

It is certified that error appears in the above-identified patent and that said Letters Patent is hereby corrected as shown below:

In the Specification

In Column 8, Line 17, delete "$L_{diff}(P^C, y)$," and insert --$L_{diff}(P^0, y)$,-- therefor Signed and Sealed this
Second Day of September, 2025

Coke Morgan Stewart
*Acting Director of the United States Patent and Trademark Office*